United States Patent
Cadalen et al.

(10) Patent No.: US 11,162,519 B2
(45) Date of Patent: Nov. 2, 2021

(54) STRAPPING DEVICE

(71) Applicant: THALES, Courbevoie (FR)

(72) Inventors: François Cadalen, Sophia Antipolis (FR); Yohann Fraisse, Sophia Antipolis (FR); François Warnan, Sophia Antipolis (FR)

(73) Assignee: THALES, Courbevoie (FR)

( * ) Notice: Subject to any disclaimer, the term of this patent is extended or adjusted under 35 U.S.C. 154(b) by 83 days.

(21) Appl. No.: 16/473,982

(22) PCT Filed: Dec. 27, 2017

(86) PCT No.: PCT/EP2017/084637
§ 371 (c)(1),
(2) Date: Jun. 26, 2019

(87) PCT Pub. No.: WO2018/122257
PCT Pub. Date: Jul. 5, 2018

(65) Prior Publication Data
US 2021/0131463 A1    May 6, 2021

(30) Foreign Application Priority Data

Dec. 27, 2016 (FR) ..................... 1601876

(51) Int. Cl.
*F16B 2/08* (2006.01)
*H01Q 1/30* (2006.01)

(52) U.S. Cl.
CPC ............. *F16B 2/08* (2013.01); *H01Q 1/30* (2013.01)

(58) Field of Classification Search
CPC .................. A61B 2/08; A61B 33/04
See application file for complete search history.

(56) References Cited

U.S. PATENT DOCUMENTS

| 1,172,690 A * | 2/1916 | Erickson | F16L 33/04 24/279 |
| 2,341,828 A * | 2/1944 | Tetzlaff | F16L 33/04 24/279 |
| 3,765,066 A * | 10/1973 | Nitz | F16L 33/04 24/279 |
| 6,877,191 B2 * | 4/2005 | Logan | F16L 33/04 24/19 |
| 10,323,666 B2 * | 6/2019 | Drivon | F16B 2/08 |

FOREIGN PATENT DOCUMENTS

| DE | 10 2006 029242 A1 | 1/2007 |
| FR | 2 373 707 A1 | 7/1978 |
| GB | 851 954 A | 10/1960 |
| KR | 2010-0135275 A | 12/2010 |
| WO | 2011/091135 A2 | 7/2011 |

* cited by examiner

*Primary Examiner* — Robert Sandy
(74) *Attorney, Agent, or Firm* — BakerHostetler

(57) ABSTRACT

A strapping device for binding an object which has a cross section having a regular-shaped perimeter, the device includes a strap having a clamping strip which forms a loop intended to surround the object, the clamping strip has a central part which has a shape essentially following the shape of the perimeter of the cross section of the object and two strip strands having the respective ends of the clamping strip, the shape of which departs from the shape of the perimeter of the cross section of the object, the strap having at least one so-called central shoe which is mounted on at least one of the strip strands in such a way as to be designed to be interposed between the object and the strip strand.

31 Claims, 5 Drawing Sheets

STRAPPING DEVICE

CROSS-REFERENCE TO RELATED APPLICATIONS

This application is a National Stage of International patent application PCT/EP2017/084637, filed on Dec. 27, 2017, which claims priority to foreign French patent application No. FR 1601876, filed on Dec. 27, 2016, the disclosures of which are incorporated by reference in their entirety.

FIELD OF THE INVENTION

The present invention relates to a strapping device serving to strap an object.

BACKGROUND

This type of device is implemented in particular in detection devices for helicopter-borne warfare against submarine threats, in which an antenna for detecting submarine threats is suspended from an aerial platform such as an aircraft which makes it possible to submerge the antenna. The antenna comprises the transmitters and receivers per se, and potentially electronic equipment associated with the transmitters and receivers. It may also comprise environmental sensors. Moreover, on board the aerial platform, the detection device comprises equipment required for generating the acoustic signals and processing the received acoustic data.

An example of a detection device is shown in FIG. 1. It comprises a winch 100 designed to be installed in an aerial platform. The airborne warfare device comprises an antenna 101 suspended at the end of an electric-mechanical cable 102 of the winch 100, possibly provided with a funnel 103 as is the case in FIG. 1. The winch 100 is designed to deploy and recover the antenna 101. In FIG. 1, the winch 100 is secured to a floor 200 of an aerial platform. The electric-mechanical cable 102 serves to carry signals and the electrical energy required for the acoustic transmission and/or the operation of the receivers. Unwinding the cable 102 using the winch 100 lowers the antenna 101 through the funnel 103 (if present) into the water. Winding the cable 102 serves to raise the antenna 101 into the aerial platform within the funnel 103 (if present) as shown in FIG. 1.

The antenna 101 is in the form of an essentially cylindrical elongate dome. It comprises an elongate body 112 having an outer circumference of essentially circular cross section in a plane perpendicular to the longitudinal axis z of the antenna 101. The elongate body 112 is surrounded by a protective structure (or "bumper") 113 having an outer circumference of essentially circular cross section in a plane perpendicular to the longitudinal axis z of the antenna 101. The outer circumference of the protective structure 113 and the outer circumference of the elongate body 112 are essentially concentric. It extends along a longitudinal axis z. When the antenna 101 is suspended by its own weight by the cable 102, the latter also extends along the longitudinal axis z.

Keeping the antenna 101 in place in the aerial platform solely by means of the cable 102 does not make it possible to obtain an adequate level of safety when the aerial platform is in transit, in particular over populated areas. The cable 102 may break, it may be cut accidentally by the pyrotechnic safety cutter, the brake on the winch 100 may fail and accidentally release the cable. The loss of the antenna 101 represents a considerable financial loss but above all its large mass could fall into the sea or to the ground causing serious material or human damage.

The position of the antenna 101 with respect to the winch 100 must be locked when it is in place on board the aerial platform. The detection device then advantageously comprises a strapping device 104. This strapping device 104 serves to lock the position of the antenna 101 with respect to the winch 100 so as to prevent an accidental fall of the antenna and the associated consequences.

A prior art strapping device 104 is shown in FIG. 2. It comprises a strap 105 comprising a clamping strip 106 and shoes 114 designed to be interposed between the protective structure 113 and a circular portion of the clamping strip 106. It also comprises a drive device 115 serving to move longitudinal ends 110 and 111 of the clamping strip 106 with respect to one another so as to reduce the size of the loop in order to be able to grip an object, for example the protective structure 113 of the antenna 101, during a so-called clamping step, or to increase the size of the loop in order to be able to unclamp or release an object initially gripped by the strap 105, during a so-called unclamping step.

Keeping the antenna in place requires considerable clamping of the strap 105 around the protective structure 113. However, the applicant has observed deformations of the protective structure which could have caused irreversible damage to the protective structure and also could have released the antenna from the strap, leading to it falling.

SUMMARY OF THE INVENTION

One aim of the present invention is to limit the above-mentioned drawback.

To that end, the invention relates to a strapping device for binding an object which has a cross section having a regular-shaped perimeter, said device comprising a strap comprising a clamping strip which forms a loop intended to surround the object, the clamping strip comprising a central part which has a shape essentially following a shape of the perimeter of the cross section of the object and two strip strands comprising the respective ends of the clamping strip and having a shape which departs from the shape of the perimeter of the cross section of the object, the strap comprising at least one so-called central shoe which is mounted on at least one strip strand in such a way as to be designed to be interposed between the object and the strip strand.

Advantageously, a free volume is created between a regular shape defined by the central part and the strip strands, the central shoe occupying part of the free volume.

Advantageously, the central shoe is mounted so as to be free to move along the strip strand so as to be able to slide in a longitudinal direction of the strip strand.

Advantageously, the central shoe is mounted so as to be able to slide along the strip strand by cooperation of shapes between the central shoe and the strip strand.

Advantageously, the central shoe comprises an interface part designed to be interposed between the strip strand and the object, the interface part becoming thicker along the strip strand in the direction of the other strand.

Advantageously, the central shoe has an interface part designed to be interposed between the strip strand and the object that is to be gripped, comprising an outer face which faces the strip strand, the outer face essentially following the shape of the strip strand in the longitudinal direction of the strip strand.

Advantageously, the shape of the central shoe is defined such that the central shoe causes the strip strand to deviate when an object having the regular-shaped cross section and a predetermined diameter is clamped by the strap such that a clamping force is exerted on the object by the strip strand.

Advantageously, the shape of the central shoe is defined such that, when the object is clamped by the strap, an essentially uniform clamping force is exerted on the shoe essentially over the entire circumference of the object. More generally, the central shoe is configured such that, when the object is clamped by the strap, an essentially uniform clamping force is exerted on the shoe essentially over the entire circumference of the object.

Advantageously, the central part essentially describes an arc of a circle. Advantageously, the central shoe comprises an interface part designed to be interposed between the clamping strip and the object that is to be gripped, the interface part comprising a face which is designed to face the object and which essentially describes an arc of a circle.

Advantageously, the strap comprises multiple conventional shoes mounted on the central part so as to be designed to extend between the clamping strip and the object.

Advantageously, each conventional shoe adjacent to the central shoe comprises an interface part designed to be interposed between the central part and the object that is to be gripped, the central shoe comprising an interface part designed to be interposed between the strip strand and the object that is to be gripped, the interface part of the central shoe having, at each end adjacent to a conventional shoe, a thickness essentially equal to a thickness of an end of the interface part of the adjacent shoe located facing the central shoe.

Advantageously, the thickness of an interface part of the central shoe, designed to be interposed between the strip strand and the object in a radial direction of a circle defined by the central part, is greater than the distance between this circle and the strip strand in this radial direction in the absence of an object.

Advantageously, a maximum clearance provided between the central shoe and each conventional shoe adjacent to the central shoe, in operational service, is greater than the maximum clearance between two adjacent conventional shoes.

Advantageously, the central shoe is mounted removably on the clamping strip solely by cooperation of shapes between the central shoe and the clamping strip.

Advantageously, the device comprises a travel limiter which serves to prevent a size of the loop falling below a predetermined minimum size or exceeding a predetermined maximum size in operational service, it being possible to neutralize the travel limiter, the central shoe and the clamping strip being configured such that the central shoe can be separated from the strip strand, and more generally from the strip, only when the size of the loop is below the minimum size or respectively when the size of the loop is above the maximum size.

Advantageously, the strapping device comprises a frame and a clamping/unclamping device which serves to widen the size of the loop and/or to reduce the size of the loop and which is configured to move the ends of the clamping strip essentially symmetrically with respect to a plane of symmetry linked to the frame, the central shoe being mounted on the frame so as to occupy a fixed position with respect to the frame in a direction essentially perpendicular to the plane of symmetry.

Advantageously, the shoe is radially mobile with respect to the frame.

Advantageously, the strapping device comprises a clamping/unclamping device serving to pull or push on the ends of the strip strands so as to move them with respect to one another.

Advantageously, the central shoe bears against the two strip strands so as to be designed to be interposed between the two strip strands and the object that is to be gripped.

Advantageously, the clamping strip comprises two strip strands that intersect such that the clamping strip defines a closed loop designed to bind the object.

Advantageously, the central shoe bears against the two strip strands on either side of the intersection zone and at a distance from the intersection zone.

The invention also relates to a detection device comprising a strapping device, an antenna being the object to be bound, and a winch comprising a cable, the antenna being suspended from the cable and the strapping device being suspended from the winch.

BRIEF DESCRIPTION OF THE DRAWINGS

The invention will be better understood on studying a few embodiments described by way of completely non-limiting example and illustrated by appended drawings, in which.

From one figure to another, the same elements are denoted using the same reference numbers.

DETAILED DESCRIPTION

Figure 1:
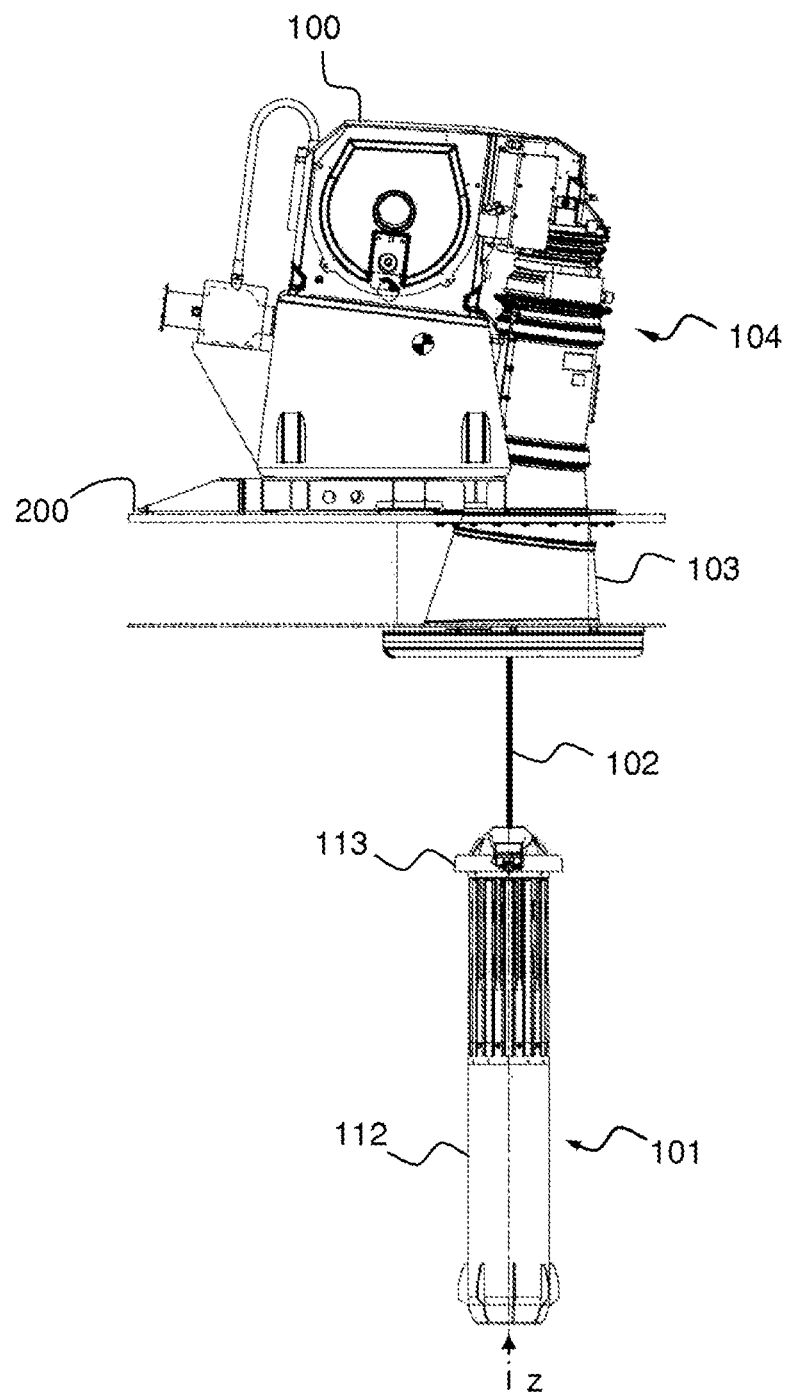
FIG. 1, which has already been described, shows, schematically, a detection device, FIG. 2, which has already been described, shows, schematically and in section per a transverse plane, a strapping device of the prior art surrounding an antenna of a detection device.
Figure 2:
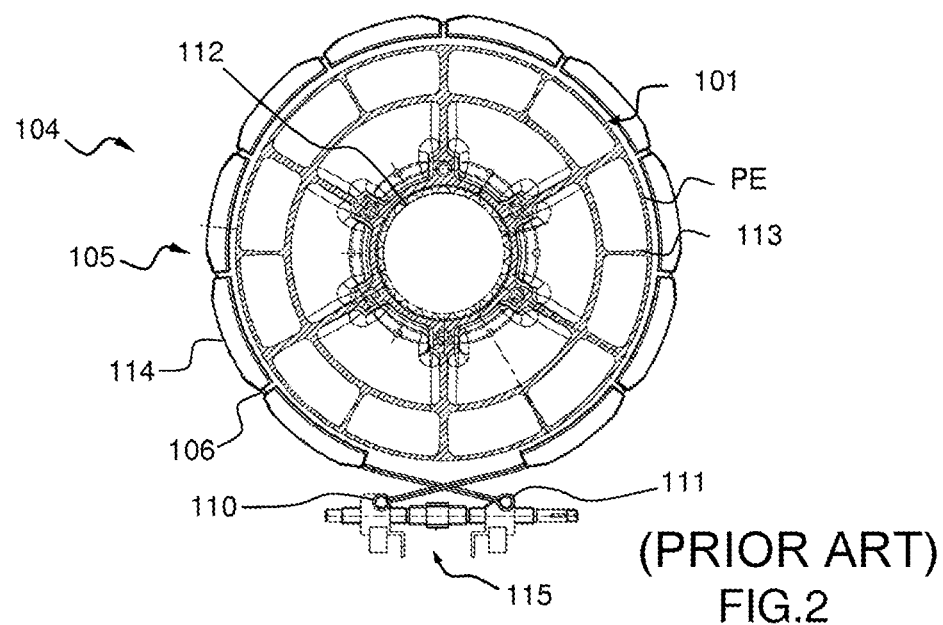

The invention relates to a strapping device 4 that is designed to be integrated into an airborne warfare device as described previously. The invention also relates to the airborne warfare device or detection device as shown in FIG. 1, comprising the strapping device 4 according to the invention. The airborne warfare device according to the invention differs from that of FIG. 1 by the strapping device 4. The strapping device 4 may more generally be used to grip any type of object, preferably one with a circular cross section.

Figure 3:
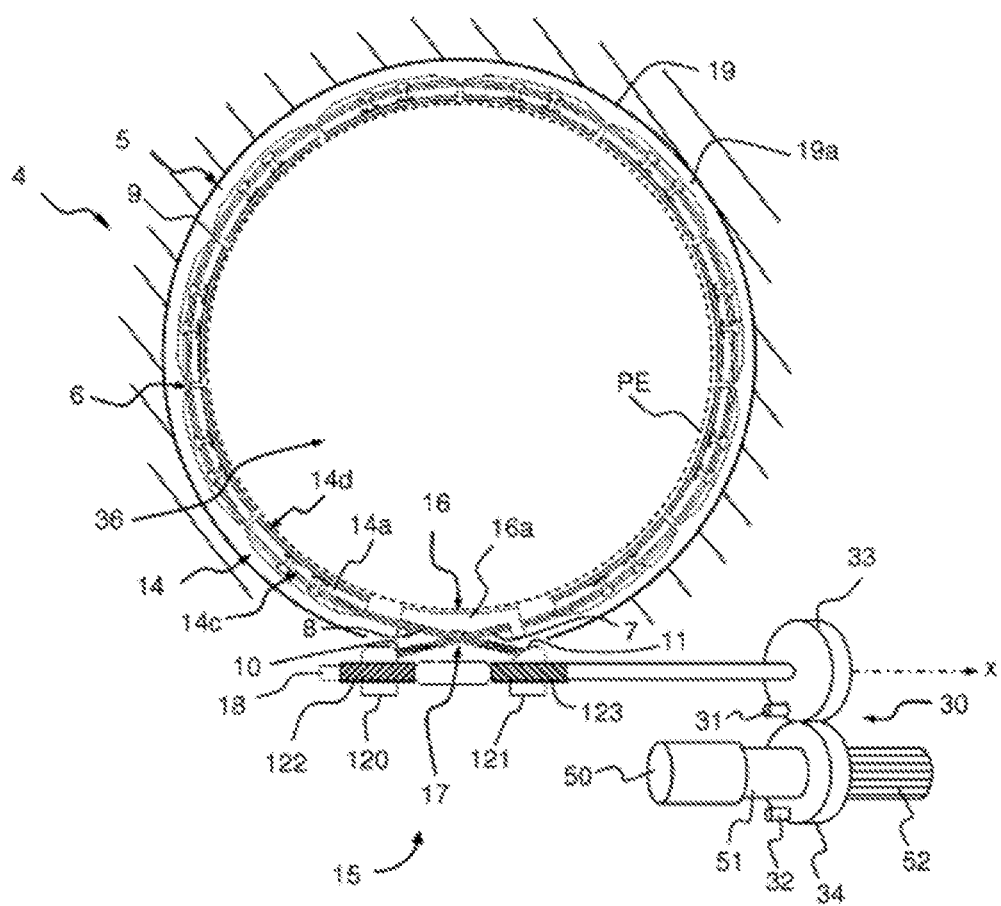
FIG. 3 shows, schematically, the strap according to the invention, in section per a transverse plane T shown in FIG. 4; elements of the drive device are shown in perspective.

As shown in FIG. 3, the strapping device 4 comprises a strap 5 that is suitable for binding an object, for example the antenna 101, making it possible to grip or release the object. The strap 5 comprises a clamping strip 6 forming a loop intended to surround the antenna 101, the outer perimeter PE of which is depicted by the dashed line. This perimeter PE has a circular cross section in the plane T.

Figure 4:
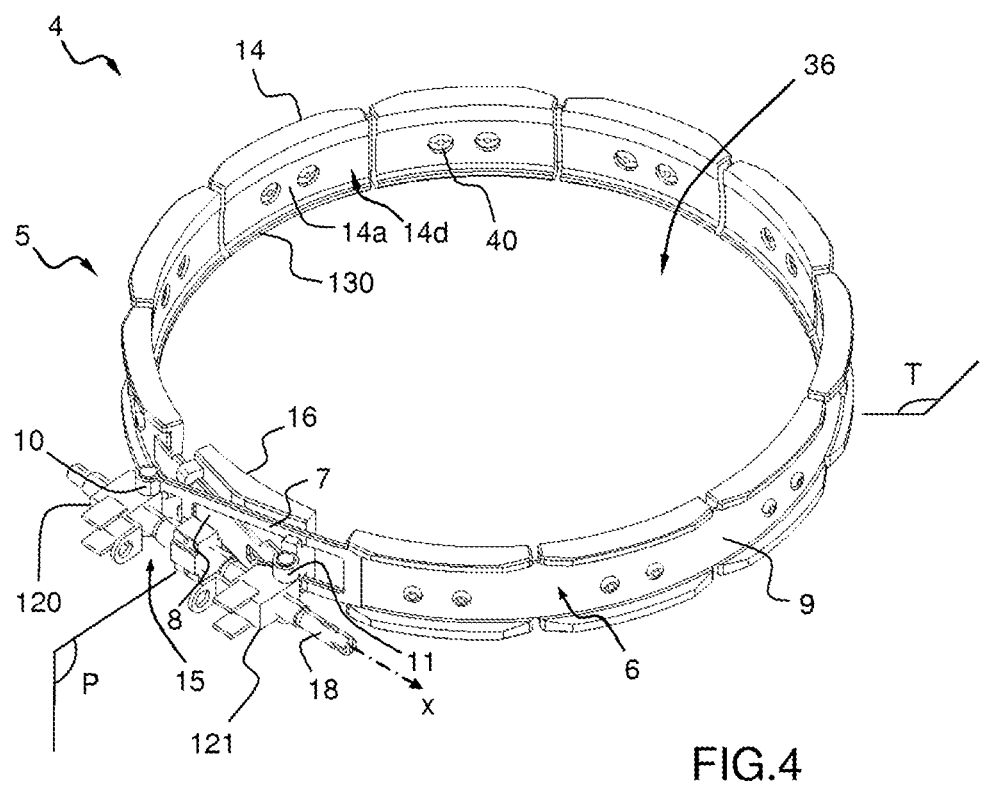
FIG. 4 shows, schematically and in perspective, the strapping device according to the invention, all the elements of the clamping/unclamping device that appear in FIG. 3 are not shown.

The loop extends essentially in a transverse plane T, which is shown in FIG. 4. This plane is the median plane of the clamping strip 6. The strapping device 4 is advantageously suspended from the winch 102 such that the transverse plane T is designed to extend essentially perpendicular to the longitudinal axis z of the antenna 101, which is a vertical axis (vertical being defined with respect to a terrestrial reference sy stem).

The strapping device 4 also comprises a clamping/unclamping device 15. The clamping strip 6 extends between two longitudinal ends 10 and 11, shown in FIG. 4. The clamping/unclamping device 15 serves to move the longitudinal ends 10 and 11 of the clamping strip 6 relatively with respect to one another so as to reduce the size of the loop in order to be able to grip an object, for example the antenna 101, during a so-called clamping step, or to increase the size of the loop in order to be able to unclamp or release an object initially gripped by the clamping strip 6, during a so-called unclamping step. To vary the size of the loop is to vary the length of the perimeter, that is to say of the diameter of the loop. Shortening of the perimeter of the loop, which arises during clamping, produces a pressure on the object that is to be gripped, and creates an assembly by clamping between the clamping strip and the object. In order to maintain the clamping of the object, the clamping/unclamping device maintains tensile forces on the ends 10 and 11.

The clamping strip 6 comprises a central part 9 and two strip strands 7 and 8, each comprising one of the ends 10 or 11 of the clamping strip 6. The strip strands 7 and 8 are connected to one another by the central part 9 extending longitudinally between the two strands. The central part 9 has a shape that is designed to essentially follow a shape of the perimeter PE of the cross section of the object that is to be gripped. In other words, the central part 9 extends essentially parallel to the perimeter. The shape of the central part 9 which follows that of the perimeter is the shape of the cross section of the central part 9 in the transverse plane T and more particularly that of the cross section of the inner face of the central part 9 that is designed to face the object. The shape of the central part 9 follows the shape of a part of the perimeter PE of the cross section of the object 101 that is to be gripped. The central part 9 has a regular shape. The two strip strands 7 and 8 each have a shape which departs from the regular shape of the perimeter of the object, that is to say the shape followed by the central part 9. In other words, the cross section of each strand 7, 8 in the plane T has a shape which departs from the shape of the cross section of the central part 9 in the plane T. In other words, the shape of the cross section of the inner face of each strand that is designed to face the object moves away from the shape of the cross section of the inner face of the central part 9 in the plane T. The loop has an irregular shape in the plane T. Thus, upon clamping an object, a free volume is created between the object clamped by the strap 5 and the strip strands 7, 8, which can lead to a deformation of the object that is likely to release the object. In other words, a free volume is created between the regular shape defined by the central part 9 and the strip strands 7 and 8.

In order to address this drawback, the strap according to the invention comprises at least one shoe 16, referred to as the central shoe, which is mounted on at least one strip strand 7 and/or 8 in such a way as to be designed to be interposed between the object and the clamping strip and more particularly between the object and the strip strand. In the example of the figures, the shoe 16 is mounted on the two strands. It serves to fill part of the free volume left between the strip strands 7, 8 and the object, and thus limit the deformation of the object. In other words, the central shoe 16 fills part of the free volume left between the regular shape followed by the central part 9 and the strip strands 7 and 8.

The central shoe 16 retains the object that is to be gripped, which will limit deformation of the latter during clamping.

Advantageously, the shape of the central part 9 essentially follows the shape of the perimeter of the object over the majority of the perimeter of the object 101 so as to surround the majority of the object or almost all of the object.

In the embodiment of the figures, the strip strands 7 and 8 intersect in an intersection zone 17 such that the clamping strip 6 defines a closed loop that is designed to completely surround the object that is to be gripped. The strip strands 7, 8 form an X in the plane T. The use of a strip forming a closed loop by intersecting two strip strands 7 and 8 makes it possible to significantly vary the size of the loop and thus to grip and release objects having different diameters. This configuration serves to facilitate the production and assembly of the clamping/unclamping device 15 since the two free ends 10 and 11 are not on a same straight line as the intersection zone 17. The X comprises two ends that are connected to one another by the central part 9, and two ends which are the ends 10 and 11. The distance between the two ends 10 and 11, along the axis x, increases during clamping and decreases during unclamping, and the diameter of the circle defined by the central part 9 decreases and increases respectively. When the size of the loop varies, the angle formed between the strip strands varies. As a variant, the loop is open.

When the perimeter PE is circular, the central part 9 essentially describes an arc of a circle in the plane T, as shown in FIG. 3. The strip strands 7, 8 form an X in the plane T. Thus, the space 36 that is completely surrounded by the closed loop formed by the clamping strip 6 has, in the transverse plane T, an essentially teardrop-shaped cross section, having a circular part and a pointed part defined by the strip strands 7, 8. The central shoe 16 fills part of the pointed part. If the loop is open and the central part essentially describes an arc of a circle, the space surrounded by the loop, in the transverse plane T, a truncated teardrop shape having a circular part and a truncated pointed part delimited by the strands 7, 8. The shoe fills part of the truncated pointed part.

In the embodiment of the figures, the two strands 7 and 8 extend longitudinally and essentially along respective straight lines. In other words, the two strip strands 7 and 8 have sections that are essentially straight in the transverse plane T. These straight lines are at an angle to one another so as to form the X. The strands 7, 8 do not necessarily follow a straight-line shape, they might follow a curve whose radius of curvature increases from the central part 9 toward their respective free ends 10 and 11, or toward the intersection zone 17. In general terms, the strip strands 7, 8 have, in the plane T, a radius of curvature that is greater than that of the central part 9 at the ends of the respective strands.

The invention applies to any object having a cross section whose perimeter has a regular shape. Advantageously, the perimeter has the shape of a closed, convex, curved line, which may be a circle or may differ from a circle, and may or may not have a center of symmetry. As a variant, the regular shape is a regular polygon such as a hexagon. The shape of the central part 9 in the plane T may then be essentially a convex curved line and the strip strands 7 and 8 move away from this curved line. The strip strands have, in the plane T, a radius of curvature that is greater than that of the central part 9 at the ends of the strip strands 7 and 8. The strip strands 7 and 8 intersect in an X shape, or come close to one another, forming for example a truncated V, so as to reduce the opening of the open loop formed by the central part 9 as they move away from the shape of the central part 9. The loop formed by the clamping strip 6 for example surrounds a closed, convex, curved line, the central part 9 delimits a part of this curved line and the strip strands 7 and 8 delimit an excrescence, for example in the shape of an X or a truncated V, on the closed, convex, curved line.

The strip 6 comprises for example a metal ribbon or a strip of plastic material or of composite material. The size of the loop varies during clamping by varying the bending of the strip. Advantageously, the shape of the strip 6 at rest is such that the shape of the central part 9 essentially follows the shape of the perimeter of the object that is to be gripped. The strands 7 and 8 each have, at rest, a shape which moves away therefrom, for example an essentially straight-line shape at rest. The strip may be formed by an assembly of parts, or may be in one piece.

The device is designed to grip an object under operational service conditions. In operational service, the size of the loop is between a minimum size and a maximum size. The average radius of curvature of the central part 9 between these two limits is advantageously the average radius of curvature of the object that is to be gripped. The distance between the ends 10 and 11 is then between a minimum distance and a maximum distance.

In the embodiment of the figures, the strap 5 comprises a single central shoe 16 mounted on the two strip strands 7 and 8 so as to be interposed between the two strip strands 7 and 8 and the object that is to be gripped. When the strands 7, 8 intersect, the central shoe 16 is designed to be interposed between the intersection zone 17 and the object that is to be gripped. As a variant, the strap 5 comprises one or more central shoes, each one pressing against just one of the strands 7 or 8. It comprises for example two central shoes, with a first shoe pressing against a strip strand 7 and a second shoe pressing against the strip strand 8. The features described in the present patent application relating to the central shoe pressing against two strip strands apply in the case where the shoe presses against a single strand, but are defined with respect to this single strand.

The central shoe 16 has an interface part 16a, shown in FIG. 3, located inside the space 36 bounded by the loop. The interface part 16a is designed to be interposed between the object 101 and the strands 7 and 8. The part 16a extends from the strand 7 to the strand 8 within the space 36. As a variant, the part 16a extends along a single strand 7 or 8.

Advantageously, the interface part 16a becomes thicker along each strip strand 7 and/or 8 against which it presses, moving away from the central part 9, that is to say moving away from the end of the strand connected to the central part, in the direction of the other strand. In the case in which the strands intersect, the interface part thickens along each strip strand against which it presses, in the direction of the intersection zone 17. This form makes it possible to fill a maximum of the free volume, which further limits its deformation.

The interface part 16a has an outer face 16e designed to face the strip strands 7 and 8, and an inner face 16d designed to face an object that is to be gripped.

Advantageously, the interface part 16a of the shoe 16 mounted on the two strip strands 7 and 8 has, in the transverse plane T, a thickness which is greater in its central part than at its two ends 16b and 16c. The thickness of the interface part 16a is a distance, in the transverse plane T, between the inner face 16d and the outer face 16e in a radial direction, that is to say a radial axis of the loop. That is also the case for the conventional shoes, which will be defined subsequently. In one variant, the interface part 16 of the central shoe 16 has a fixed thickness between its two ends 16b, 16c.

In the embodiment of the figures, the section of the inner face 16d in the transverse plane T is advantageously essentially a portion of a circle of diameter D (the diameter of the object that is to be gripped). This makes it possible to ensure that the central shoe conforms well to the shape of the circular object 101. Generally, the section of the inner face 16d advantageously follows the shape of the perimeter of the object that is to be gripped, facing the shoe 16. The section of the outer face 16e in the plane T then has a variable radius of curvature in the transverse plane T for a shoe of variable thickness along the strip strand(s).

Advantageously, the outer face 16e essentially follows the shape of the strip strand(s) against which it presses, in the plane T, that is to say in the longitudinal direction of the strip strand(s). The pressure zone then extends along the strip strand.

In the particular embodiment of the figures, the outer face 16e forms, in the plane T, a V that points toward the intersection zone 17.

The outer face 16e forms for example, in the transverse plane T, a curve comprising two parts of equal length, that is to say of equal angular opening, and having a second radius of curvature which is greater than the first radius of curvature. These parts are connected by a central zone of the interface part having a third radius of curvature which is smaller than the second radius of curvature. As a variant, the radius of curvature of the inner face is variable in the transverse plane T, and that of the outer face is fixed. In another variant, the radii of curvature of both faces, in the transverse plane T, are variable. Advantageously, and as is the case in the figures, the section of the interface part 16a in the plane T has a plane of symmetry.

Advantageously, the central shoe 16 is configured, and more precisely its interface part 16a is configured, such that a clamping force is exerted on an object of circular cross section and of predetermined diameter D by the strip strands 7, 8, via the central shoe 16, when this object is gripped by the clamping strip 6. In other words, the shape of the central shoe 16 is defined taking into account its thickness so as to obtain this deviation. This shape is advantageously defined such that the shoe deviates, that is to say bends or varies the curvature of the strip strands 7, 8 so as to obtain this clamping force (having a radial component). The strands 7 and 8 will flex on either side of the intersection zone 17, they no longer have a straight section. This makes it possible to further limit the deformation of the object toward the strip strands by evening out the pressure or the clamping force exerted on the object 101. This clamping force has at least one radial component. It is exerted via the interface part 16a. Thus, the thickness of the interface part 16a in a radial direction of a circle bounded by the central part 9 of the strip is advantageously greater than the distance between this circle and one of the strip strands in this radial direction in the absence of an object. The variation in thickness of the interface part 16a along the strip strands depends on the rigidity of the clamping strip and on the maximum clamping force that is to be applied to the object.

However, if the shape of the shoe 16 is badly defined, the shoe 16 may be made to react all of the forces and the object may deform in the opposite direction from the shoe 16. For preference, the shape of the central shoe 16 (or of the central shoes when more than one of these are present) is defined such that an essentially even stress is exerted on an object of circular cross section and of predetermined diameter D essentially over the entire circumference of the object when the object is gripped by the clamping strip 6. In other words, this stress is radial and has essentially the same modulus all around the object. This makes it possible to minimize the deformation of the object by evening out the pressure or the clamping force exerted on the object 101.

More generally, the central shoe 16 is configured, and more precisely the interface part is configured, such that the central shoe 6 deviates the strip strand(s) against which it presses when an object whose cross section has the regular shape essentially followed by the central part 9 and a predetermined diameter is clamped by the clamping strip, so as to apply a clamping force on the object, via the shoe 16. This configuration comprises the shape and the thickness of the shoe or of its interface part, that is to say its shape taking into account its thickness.

Advantageously, the central shoe 16 bears against the clamping strip 6 on either side of the intersection zone 17 and is located at a distance from the intersection zone 17. In other words, the central shoe 16 presses against the clamping strip 6 at both ends 16b, 16c of the interface part 16a. The first end 16b is in contact with the first strand 7 and the second end 16c is in contact with the second strand 8. The central shoe 16 is located at a distance from the clamping strip 6, facing the intersection zone 17. The thickness of the interface part 16a of the central shoe 16 is defined so as to verify this feature. This feature is advantageously verified in operational service. In operational service, the angle formed between the two strip strands 7 and 8 outside the loop is greater than or equal to a predetermined minimum value. This minimum value depends on a minimum size of the loop in operational service (that is to say a maximum distance between the two ends in the case of the figures), on the diameter D of the object and on the stiffness of the clamping strip. The angle between the two strapping strands reduces for two reasons: first, the clamping device moves the free ends of the strands of the clamping strip away from one another, then the assembly formed by the strapping strip and the object clamped by the strip tries to move laterally toward the clamping device which is fixed (the gripped object does not remain at the center of the frame). This configuration makes it possible to facilitate the creation of the shoe. Indeed, it is not necessary, to even out the clamping force, for the shape of the shoe to match the deformed shape of the strip strands 7 and 8 when the object of diameter D is gripped.

Advantageously, the interface part 16a presses against the strand 7 over approximately one-third of the length of the shoe 16 and presses against the strand 8 over approximately one-third of the length of the shoe 16. Thus, the central shoe 16 is located at a distance from the clamping strip over approximately one-third of its length.

In the embodiment of the figures, shoes referred to as conventional shoes 14 are distributed along the central zone 9 and are arranged so as to be designed to be interposed between the clamping strip 6 and the object 101 that is to be gripped such that the clamping force applied by the clamping strip 6 on the object that is to be gripped, at the shoes 14, is applied by the intermediary of the shoes 14. To that end, the conventional shoes 14 extend at least partially into the volume 36 bounded by the loop formed by the clamping strip 6.

The conventional shoes 14, like the central shoe 16, are advantageously made of plastic material. As a variant, they may be made of rubber or metal.

Each conventional shoe 14 has an interface part 14a which is located inside the space 36 bounded by the loop and which is designed to be interposed between the conventional shoe 14 and the clamping strip 6 such that the clamping strip exerts, at the shoe 14, a compressive force on the object via the interface part 14a. The shape of the shoe 16 is defined with respect to these shoes. In this case, the force exerted essentially over the entire circumference of the object is essentially uniform if the force exerted by the strip via each of the shoes 14, 16 is essentially radial.

The interface part is bounded by an inner face 14d that is designed to face the object 101 and an outer face 14c that faces the clamping strip 6. Advantageously, the inner face 14d essentially follows the shape of the perimeter of the object that is to be gripped, at the respective shoes, in the plane T. The shoes 14 then conform to the object that is to be gripped during clamping. Advantageously, the shoes 14 have a thickness that is constant in the longitudinal direction of the clamping strip 6. In other words, surfaces 14d and 14c have sections that are parallel in the plane T. In the case of an object of circular cross section, the inner faces 14d and 14c advantageously form portions of circles in the plane T. The inner face 14d advantageously has a radius of curvature which is equal to that of the object that is to be gripped, and the outer face 14c has a greater radius of curvature.

Advantageously, the conventional shoes have an identical section in the transverse plane T. This promotes an even clamping force, in particular when the cross section of the object that is to be gripped is circular. As a variant, the conventional shoes are not all identical.

Advantageously, the interface part 16a of the central shoe 16 has, at each end 16c, 16d adjacent to a conventional shoe 14, a thickness which is essentially equal to a thickness of the interface part 14a of the conventional shoe adjacent to the central shoe 16 at the end 16c or 16d in question. This makes it possible to avoid the central shoe 16 taking up the entire load of the object that is to be gripped and thus unloading its neighbors, recreating, this time at two points (either side of the central shoe) the defect which is to be corrected. In other words, this feature promotes the evenness of the radial force applied to the object that is to be gripped, over its circumference, in particular when the latter has a circular cross section. This is also the case when the shoe comprises multiple shoes or one shoe mounted on a single strip strand.

By contrast, the section of the central shoe 16 in the transverse plane differs from that of the conventional shoes 14. The shape of this section is defined as set out above. As a variant, the section of the central shoe 16 in the transverse plane is identical to that of the central shoes.

As a variant, the strap has no conventional shoes 14. The central part 9 comes into contact with the object 101 during clamping.

Advantageously, the central shoe 16 is mounted so as to be free to move along the strip strands 7 and 8 so as to be able to slide in the longitudinal directions of the strip strands 7 and 8 during clamping and unclamping operations. The interface part 16a slides along these strip strands 7 and 8. This serves to promote even clamping, by allowing the central shoe 16 to always remain centered on the intersection of the two strands 7 and 8 of the strap during clamping. The central shoe 16 naturally finds its best place, relative to the clamping strip 6, during clamping. That is also promoted by the V shape of the outer face 16e of the central shoe 16. As a variant, the shoe is fixed with respect to at least one strip strand, in the longitudinal direction of the strip strand. In the event that the device comprises a central shoe mounted on a single strip strand, the shoe may be fixed or able to slide with respect to the strip strand, in the longitudinal direction of the strip strand.

Advantageously, and as is the case of the example of FIGS. 3 to 7, the central shoe 16 is mounted on the strip strands 7 and 8 by means of a connection that allows the central shoe 16 to slide with respect to the corresponding strip strand 7 or 8. The central shoe 16 is mounted so as to be able to slide along the first strand 7, in the longitudinal direction of the strand 7. The central shoe 16 is also mounted so as to be able to slide along the second strand, in the longitudinal direction of the strip strand 8. The central shoe 16 is advantageously mounted on each one of the strip strands by a connection which is essentially a rail connection, such that the sliding motion of the central shoe with respect to each strand 7 and 8 is a movement in translation.

Figure 6:
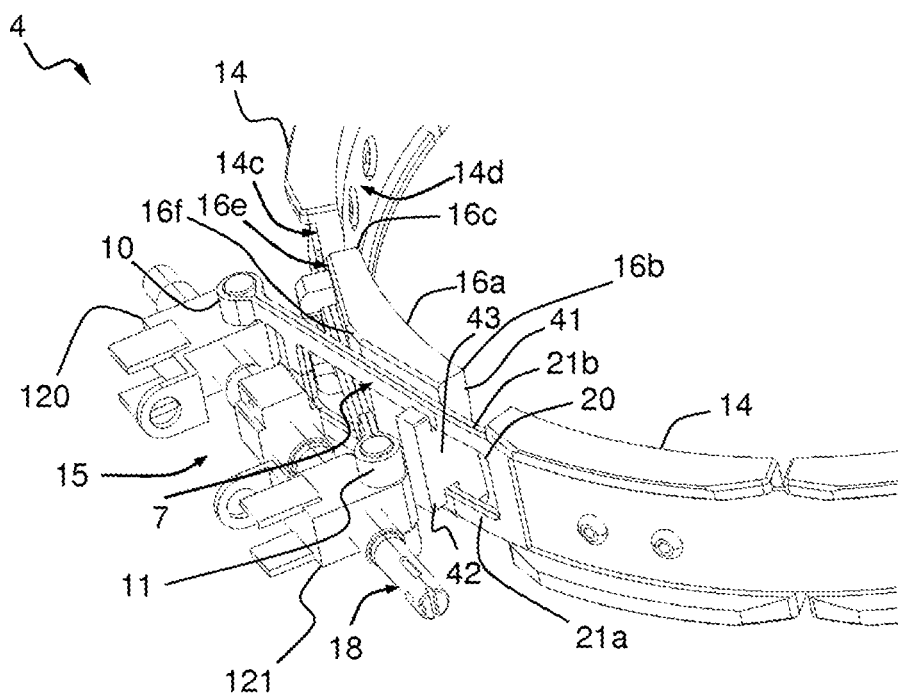
FIGS. 6 and 7 show, schematically, two more precise views of the intersection zone.
Figure 7:
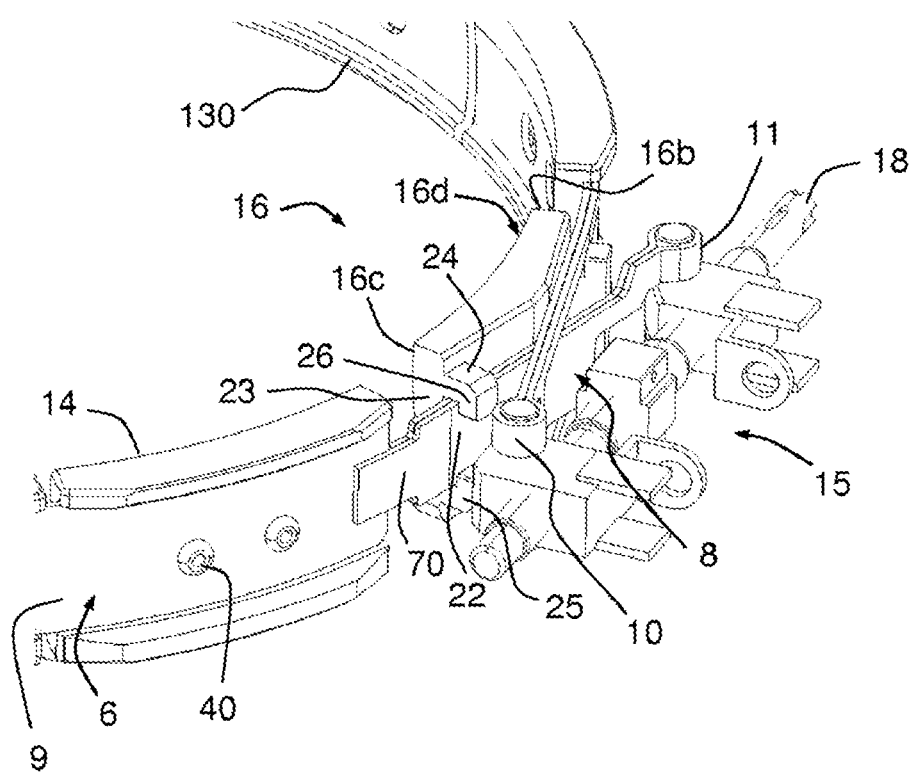

A non-limiting exemplary embodiment is shown in greater detail in FIGS. 6 and 7, from two viewpoints. In this example, the connections between the central shoe 16 and the strip strands 7 and 8 are established by cooperation of shapes between the central shoe 16 and these strands 7 and 8. This configuration has the advantage of being simple and cost-effective, and of requiring few parts, which limits the risks of corrosion. In this example, the connections are rail connections.

As shown in FIG. 6, the clamping strip 6 comprises an opening 20. The opening is bounded by two bars 21*a* and 21*b* that are elongate in the direction of the length of the strip strand 7. The central shoe 16 has an H-shaped profile comprising two tabs 41, 42 that are connected by a bar 43, said bar 43 being engaged in the opening 20 and the two tabs 41 and 42 are respectively arranged on one side and on the other side of the opening 20, each tab 41, 42 extending facing the opening 20 and the two bars 21*a* and 21*b* such that a rail connection is formed between the central shoe 16 and the first strand 7. As shown in FIG. 7, the second strand 8 comprises a rectangular plate 22. The central shoe 16 has a C-shaped profile comprising a back 23 and two bars 24, 25 that are bent back toward one another. The back 23 and the two bars 24, 25 that are bent back toward one another delimit a channel 26 within which the rectangular plate 22 passes. The two bars 24, 25 and the plate 22 are dimensioned such that the two bars 24, 25 are located facing the plate 22 so as to retain it within the channel 26, and such that a rail connection is formed between the central shoe 16 and the second strip strand 8. As a variant, it is for example possible to secure, to each of the strip strands or to the central shoe, guides which cooperate with the shoe or respectively each of the strands so as to establish the rail connection.

The central shoe 16 may be fixed in the longitudinal direction of each strip strand on which it is secured. The device comprises, for example, at least two shoes arranged either side of the intersection zone 17, each being mounted on one of the strands 7 and 8 and being fixed with respect to the respective strip strands along their respective longitudinal directions. The shoes will then come together during clamping and move apart from one another during unclamping.

As a variant, the device comprises one or more central shoes, each one being mounted on a single strip strand and being mounted so as to be able to slide along the strip strand in its longitudinal direction.

The clamping/unclamping device 15 is configured to move the clamping strip 6 with respect to the frame 19, shown in FIG. 4, during clamping and unclamping. Advantageously, the device 15 is configured to move the two ends 10 and 11 of the strip 6 parallel to an axis x at the same speed and in opposite directions with respect to the frame 19. The traction forces exerted on the two ends 10 and 11 are opposite. The movements of the two ends are symmetric with respect to a plane of symmetry P linked to the frame 19, for example perpendicular to the transverse plane T. This configuration serves to guarantee a good distribution of the forces exerted on an object that is to be gripped, having a circular section in the transverse plane. Moreover, with displacements of the ends 10 and 11 that are symmetric with respect to a plane P linked to the frame 19, the position of the intersection zone 17 remains in the plane of symmetry P.

As a variant, the free ends 10, 11 may also experience movements symmetric with one another with respect to a plane P, but along straight lines that are inclined with respect to the plane P. This configuration is not as simple to bring about as the preceding configuration. As a variant, just one of the ends is moved by the clamping/unclamping device. This configuration is less reliable since the object may appear to be adequately clamped but the forces exerted on the object even out after clamping, which can lead to accidental release of the object.

The clamping/unclamping device 15 comprises for example, as shown in FIG. 3, a system of the screw-and-nut type comprising a threaded rod 18 and two nuts 120 and 121 which are in helical connection with the threaded rod and are prevented from rotating with respect to the frame about the axis x. The nuts 120 and 121, respectively, are secured to respective ends 10 and 11 in translation with respect to the axis x. The nut 120 is in engagement with a thread 122, and the nut 121 is in engagement with a thread 123. These threads 122, 123 are for example of opposite hand with the same pitch. This device 15 may comprise a motor 50 which serves to turn the rod 18, possibly via a reduction gear, about its axis with respect to a frame 19 and/or a knob 52 which allows an operator to turn the rod with respect to the frame, possibly via a gear mechanism. As a variant, the clamping device may comprise a rack-and-pinion system, or at least a hydraulic, pneumatic or electric actuator to move the ends 10 and 11 with respect to one another. In general, the clamping/unclamping device 15 exerts traction forces directly on the ends 10 and 11 so as to pull or push them to move them with respect to one another. When the clamping/unclamping device 15 pulls on the ends 10 and 11, it tensions the clamping strip from one end to the other.

Figure 5:
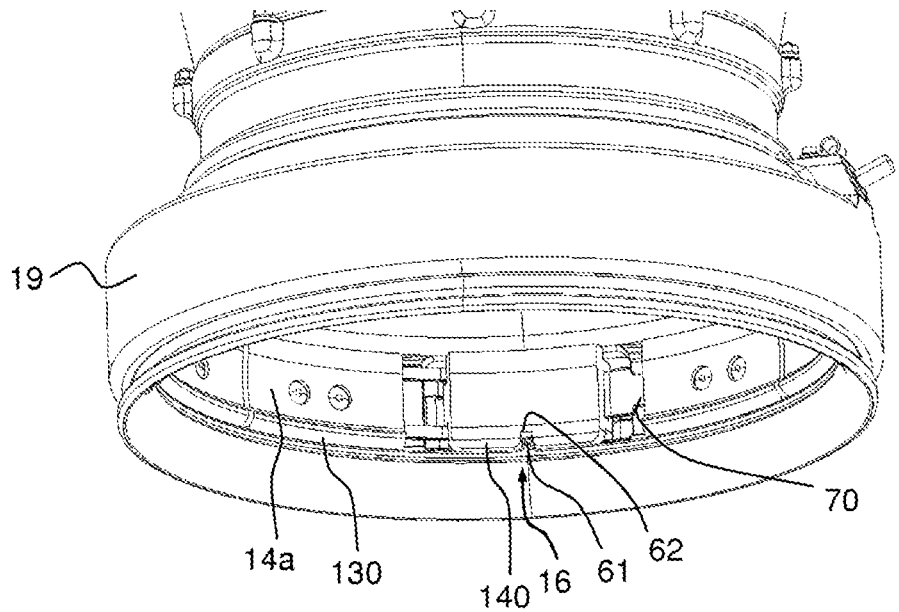
FIG. 5 shows, schematically and in perspective, the strapping device according to the invention with its frame.

Advantageously, the central shoe 16 is mounted on the frame 19 so as to occupy a fixed position with respect to a direction essentially perpendicular to the plane of symmetry P. This allows the shoe to remain centered on the intersection zone 17 in the event of symmetric displacement of the two ends 10 and 11. To that end, and as shown in FIG. 5, the frame 19 comprises, for example, a spur 61 which fits into a notch 62 formed in the central shoe 16 so as to prevent the central shoe 16 moving tangentially with respect to the frame 19. Moreover, the central shoe 16 is able to move with respect to the frame 19 along an axis of the plane P which is in the transverse plane T. This axis is a radial axis of the loop. Thus, during clamping or unclamping, the angles formed by the strip strands with respect to the plane of symmetry vary, the zone of intersection 17 of the strip strands moves in the plane of symmetry, that is to say along a radial axis, and move with them the central shoe which presses against these strip strands. For example, during clamping, the intersection zone 17 and the central shoe 16 move closer radially to the center of the loop, which allows the device to clamp an object which is not centered on the center of the loop. This device makes it possible to clamp objects having different diameters with a large tolerance with respect to the diameters of the objects.

Advantageously, the shoe is fixed with respect to the frame along an axis of the plane P which is perpendicular to the transverse plane T.

Advantageously, the conventional shoes 14 are mounted on the clamping strip 6 by means of mounting means 40, for example rivets or screws, with an attachment clearance such that when they clamp an object they naturally find their best place with respect to the strip 6. For example, the mounting means allow the conventional shoe 14 to move with respect to the clamping strip 6 in a direction radial to the portion of a circle formed by the clamping strip 6 at the conventional shoe but not in the longitudinal direction of the clamping strip 6 at the mounting means in question. This longitudinal direction is essentially a direction tangential to the clamping strip 6 or to the circle, in the transverse plane T at the attachment means in question. Thus, the distance between two adjacent conventional shoes 14 is fixed during the clamping operation. As a variant, at least one conventional shoe 14 is mounted so as to be able to slide with respect to the clamping strip 6, in the longitudinal direction of the clamping strip 6, at the attachment means in question.

The clearance, referred to as the maximum clearance, between the central shoe 16 and each conventional shoe 14 adjacent to the central shoe 16, when the loop is at its largest, that is to say its maximum diameter, is defined such that there remains a clearance, referred to as the minimum operational clearance, between the central shoe 16 and each conventional shoe adjacent to the central shoe 16 when the size of the loop is the minimum size. In other words, the maximum clearance is greater than the variation in distance between the central shoe and each of the conventional shoes adjacent to the central shoe 16 when the loop passes from its maximum size to its minimum size. The maximum clearance may be fixed when the central shoe is fixed with respect to the strip strand on which it is mounted.

Advantageously, the maximum clearance, which here is fixed, between two adjacent conventional shoes 14 is smaller than the maximum clearance between the central shoe 16 and each conventional shoe adjacent to the central shoe 16. Indeed, the variation in distance between the central shoe 16 and its neighbor(s) during clamping is greater than between two adjacent conventional shoes. For example, the clearance between two adjacent conventional shoes is half the maximum clearance between the central shoe and the conventional shoes.

Advantageously, the central shoe 16 is mounted removably on the clamping strip 6. This serves to facilitate maintenance operations for the central shoe 16. Advantageously, the central shoe 16 is mounted removably on the clamping strip 6 solely by cooperation of shapes between the shoe and the clamping strip 6. This serves to limit the number of assembly steps and the risks of corrosion by limiting the number of parts used. To that end, in FIGS. 6 and 7, the clamping strip 6 comprises a narrower part 70 located between the plate 22 and one of the conventional shoes adjacent to the central shoe. The narrower part 70 is dimensioned so as to be able to escape from the channel 26 formed by the C-shaped profile 23, 24, 25 of the central shoe 16 when the C-shaped profile faces the narrower part. The narrower part 70 thus has one dimension that is smaller than the plate 22, in a direction perpendicular to the transverse plane T. The H-shaped part of the shoe and the opening 20 are dimensioned such that, when the narrower part 70 is removed from the C, it is possible to separate the central shoe 16 from the first strand 7. It is for example possible to remove the tab 41 from the H by the opening 20, after rotating the central shoe with respect to the strand 7. This tab 41 is located on the same side as the bars of the C 24, 25 with respect to the strip 6. The bar 41 of the H thus has, for example, a height which is smaller than the dimension of the opening 20, along the clamping strip 6.

Advantageously, the central shoe 16 and the clamping strip 6 are configured so as to prevent the central shoe 16 being able to be separated from the strands 7 and 8 in operational service. This makes it possible to avoid inopportune removal of the central shoe 16 during a clamping or unclamping operation. For example, the central shoe 16 can be removed only when the size of the loop is smaller than the minimum size. In the example of the figures, the minimum clearance between the central shoe 16 and the conventional shoe 14 adjacent to the central shoe 16 and separated from the plate 22 by the narrower part 70, when the loop is at its smallest, is then greater than the distance between the conventional shoe 14 and the plate 22. The minimum clearance between the central shoe 16 and the conventional shoes 14 adjacent to the central shoe 16 is then for example greater than the minimum clearance between two adjacent conventional shoes. As a variant, the central shoe 16 can be removed only when the size of the loop is greater than its maximum size. Immobilizing the shoe 16 in a direction perpendicular to the plane P also contributes to this function.

The strapping device 4 may have a travel limiter which serves to reduce the size of the loop to below the minimum size and/or to increase the size of the loop to above the maximum size. This limiter comprises for example, as shown in FIG. 3, stops 31, 32 which are arranged so as to cooperate with one another to prevent the rotation of the threaded rod 18 with respect to the frame 19 about its axis when the size reaches the minimum size, that is to say in our example when the distance between the two ends 10 and 11 reaches a predetermined maximum distance and/or when the size of the loop reaches the maximum size. The stops 31 and 32 are arranged on wheels of a gear mechanism 33 and 34, in engagement with one another. The motor 50 drives the rod 18 in rotation about its axis via the gear mechanism 30, via the intermediary of a reduction gear 51. As a variant, the limiter function may be provided by the control of the motor.

Advantageously, the travel limiter can be neutralized. This makes it possible, during maintenance, to continue reducing the size of the loop below the minimum size (or increase the size of the loop beyond the maximum size) so as to be able to separate the shoe from the strip strands. In the example of the figures, it is possible to reduce the size of the loop such that the clearance between the central shoe 16 and the conventional shoe 14 adjacent to the central shoe 16 can drop below the distance separating the adjacent conventional shoe 14 and the plate 22. The C is then in front of the narrower part 70 such that the clamping strip 6 can escape from the channel defined by the C. This makes it possible to remove the shoe. At least one of the stops is for example removable.

Advantageously, the shoes 14 and 16 each comprise a shoulder or setback 130 and respectively 140, shown in FIGS. 4, 5 and 7, which project (in the transverse plane), on the interface part 14a or 16a in the direction of the interior of the loop, that is to say in a radial direction. Each shoulder 130 and 140 is located on a same side of the interface parts 14a and respectively 16a in a direction perpendicular to the transverse plane T. Each shoulder 130 and 140 is for example beneath the corresponding interface part 14a and respectively 16a, that is to say lower than the interface part, in a vertical direction z when the strapping device 4 is suspended from the winch 100. Thus, during clamping, the shoulder 130 or 140 comes to rest underneath the protective structure 113 so as to exert an upward vertical force so as to prevent the protective structure 113 moving downward when the protective structure 113 is gripped by the clamping strip 106 via the shoes. This makes it possible to prevent the antenna 101 from falling if the clamping force applied to the protective structure is not great enough. Creating the shoulders on the shoes is easier and has less effect on the operation of the strap than when they are created on the clamping strip.

The frame 19 advantageously delimits a channel 19*a* of essentially circular section in the plane T and having a C-shaped profile in a radial plane perpendicular to the plane T. This recess 19*a* receives the clamping strip 6 and serves as a guide therefor during the clamping and unclamping operations. Advantageously, the channel 19*a* is dimensioned such that the shoulders 130, 140 press against the frame 19 such that the latter exerts, on the shoes 14, 16, a force in a direction perpendicular to the transverse plane T, in operational service. This promotes upward retention of the antenna 101.

The invention also relates to an assembly comprising the strapping device and the object that is to be gripped.

The invention claimed is:

1. A strapping device for binding an object which has a cross section having a perimeter being a regular polygon or a closed, convex, curved line, said strapping device comprising a strap comprising a clamping strip which forms a loop intended to surround the object, the clamping strip comprising a central part which defines a shape essentially following a shape of the perimeter of the cross section of the object and two strip strands comprising the respective ends of the clamping strip and having a shape which departs from the shape of the perimeter of the cross section of the object, the strap comprising at least one central shoe which is mounted on a first strip strand of the two strip strands in such a way as to be designed to be interposed between the object and the first strip strand, a free volume being created between the shape defined by the central part and the two strip strands, the central shoe occupying part of the free volume.

2. The strapping device as claimed in claim 1, wherein the central shoe is mounted so as to be free to move along the first strip strand so as to be able to slide in a longitudinal direction of the first strip strand.

3. The strapping device as claimed in claim 2, wherein the central shoe is mounted so as to be able to slide along the first strip strand by cooperation of shapes between the central shoe and the first strip strand.

4. The strapping device as claimed in claim 1, wherein the central shoe comprises an interface part designed to be interposed between the first strip strand and the object, the interface part becoming thicker along the first strip strand in the direction of another strip strand of the two strip strands.

5. The strapping device as claimed in claim 4, wherein the thickness of the interface part of the central shoe, designed to be interposed between the first strip strand and the object in a radial direction of a circle defined by the central part, is greater than the distance between this circle and the first strip strand in this radial direction in the absence of an object.

6. The strapping device as claimed in claim 1, wherein the central shoe has an interface part designed to be interposed between the first strip strand and the object, comprising an outer face which faces the first strip strand, the outer face essentially following the shape of the first strip strand in a longitudinal direction of the first strip strand.

7. The strapping device as claimed in claim 1, wherein the central shoe is configured such that the central shoe causes the first strip strand to deviate the object having a predetermined diameter is clamped by the strap such that a clamping force is exerted on the object by the first strip strand.

8. The strapping device as claimed in claim 7, wherein the shape of the central shoe is defined such that, when the object is clamped by the strap, an essentially uniform clamping force is exerted on the shoe essentially over the entire circumference of the object.

9. The strapping device as claimed in claim 1, wherein the central part essentially describes an arc of a circle.

10. The strapping device as claimed in claim 9, wherein the central shoe comprises an interface part designed to be interposed between the clamping strip and the object that is to be gripped, the interface part comprising an inner face which is designed to face the object and which essentially describes an arc of a circle.

11. The strapping device as claimed in claim 1, comprising multiple conventional shoes mounted on the central part so as to be designed to extend between the clamping strip and the object.

12. The strapping device as claimed in claim 11, wherein each conventional shoe adjacent to the central shoe comprises an interface part designed to be interposed between the central part and the object that is to be gripped, the central shoe comprising an interface part designed to be interposed between the first strip strand and the object that is to be gripped, the interface part of the central shoe having, at each end adjacent to a conventional shoe, a thickness essentially equal to a thickness of an end of the interface part of the adjacent shoe located facing the central shoe.

13. The strapping device as claimed in claim 11, wherein a maximum clearance provided between the central shoe and each conventional shoe adjacent to the central shoe, in operational service, is greater than the maximum clearance between two adjacent conventional shoes.

14. The strapping device as claimed in claim 1, wherein the central shoe is mounted removably on the clamping strip solely by cooperation of shapes between the central shoe and the clamping strip.

15. The strapping device as claimed in claim 1, comprising a travel limiter which serves to prevent a size of the loop falling below a predetermined minimum size or exceeding a predetermined maximum size in operational service, it being possible to neutralize the travel limiter, the central shoe and the clamping strip being configured such that the central shoe can be separated from the first strip strand only when the size of the loop is below the minimum size or respectively when the size of the loop is above the maximum size.

16. The strapping device as claimed in claim 1, wherein the strapping device comprises a frame and a clamping/unclamping device which serves to widen the size of the loop and/or to reduce the size of the loop and which is configured to move the ends of the clamping strip essentially symmetrically with respect to a plane of symmetry linked to the frame, the central shoe being mounted on the frame so as to occupy a fixed position with respect to the frame in a direction essentially perpendicular to the plane of symmetry and so as to be radially mobile with respect to the frame.

17. The strapping device as claimed in claim 1, wherein the central shoe bears against the two strip strands so as to be designed to be interposed between the two strip strands and the object that is to be gripped.

18. The strapping device as claimed in claim 17, wherein the two strip strands intersect each other at an intersection zone such that the clamping strip defines a closed loop designed to bind the object.

19. The strapping device as claimed in claim 18, wherein the strapping device comprising a clamping/unclamping device serving to pull or push on the ends of the two strip strands so as to move them with respect to one another.

20. The strapping device as claimed in claim 18, wherein the central shoe bears against the two strip strands on either side of the intersection zone and is located at a distance from the intersection zone.

21. A detection device comprising a strapping device as claimed in claim 1, wherein the object is an antenna, the detection device comprising a winch comprising a cable, the antenna being suspended from the cable and the strapping device being suspended from the winch.

22. A strapping device for binding an object which has a cross section having a perimeter being a regular polygon or a closed, convex, curved line, said strapping device comprising a strap comprising a clamping strip which forms a loop intended to surround the object, the clamping strip comprising a central part which defines a shape essentially following a shape of the perimeter of the cross section of the object and two strip strands comprising the respective ends of the clamping strip and having a shape which departs from the shape of the perimeter of the cross section of the object, the strap comprising at least one central shoe which is mounted on a first strip strand of the two strip strands in such a way as to be designed to be interposed between the object and the first strip strand,
   the central shoe comprising an interface part designed to be interposed between the first strip strand and the object, the interface part becoming thicker along the first strip strand in the direction of another strip strand of the two strip strands.

23. The strapping device as claimed in claim 22, wherein the central shoe has an interface part designed to be interposed between the first strip strand and the object, comprising an outer face which faces the first strip strand, the outer face essentially following the shape of the first strip strand in a longitudinal direction of the first strip strand.

24. The strapping device as claimed in claim 22, wherein the central shoe is configured such that the central shoe causes the first strip strand to deviate the object having a predetermined diameter is clamped by the strap such that a clamping force is exerted on the object by the first strip strand.

25. The strapping device as claimed in claim 24, wherein the shape of the central shoe is defined such that, when the object is clamped by the strap, an essentially uniform clamping force is exerted on the shoe essentially over the entire circumference of the object.

26. The strapping device as claimed in claim 24, wherein the thickness of the interface part of the central shoe, designed to be interposed between the first strip strand and the object in a radial direction of a circle defined by the central part, is greater than the distance between this circle and the first strip strand in this radial direction in the absence of an object.

27. A strapping device for binding an object which has a cross section having a perimeter being a regular polygon or a closed, convex, curved line, said strapping device comprising a strap comprising a clamping strip which forms a loop intended to surround the object, the clamping strip comprising a central part which defines a shape essentially following a shape of the perimeter of the cross section of the object and two strip strands comprising the respective ends of the clamping strip and having a shape which departs from the shape of the perimeter of the cross section of the object, the strap comprising at least one central shoe which is mounted on a first strip strand of the two strip strands in such a way as to be designed to be interposed between the object and the first strip strand,
   the strapping device comprising a frame and a clamping/unclamping device which serves to widen the size of the loop and/or to reduce the size of the loop and which is configured to move the ends of the clamping strip essentially symmetrically with respect to a plane of symmetry linked to the frame, the central shoe being mounted on the frame so as to occupy a fixed position with respect to the frame in a direction essentially perpendicular to the plane of symmetry and so as to be radially mobile with respect to the frame.

28. A strapping device for binding an object which has a cross section having a perimeter being a regular polygon or a closed, convex, curved line, said strapping device comprising a strap comprising a clamping strip which forms a loop intended to surround the object, the clamping strip comprising a central part which defines a shape essentially following a shape of the perimeter of the cross section of the object and two strip strands comprising the respective ends of the clamping strip and having a shape which departs from the shape of the perimeter of the cross section of the object, the strap comprising at least one central shoe which is mounted on a first strip strand of the two strip strands in such a way as to be designed to be interposed between the object and the first strip strand,
   the two strip strands intersecting each other at an intersection zone such that the clamping strip defines a closed loop designed to bind the object.

29. The strapping device as claimed in claim 28, wherein the strapping device comprising a clamping/unclamping device serving to pull or push on the ends of the two strip strands so as to move them with respect to one another.

30. The strapping device as claimed in claim 28, wherein the central shoe bears against the two strip strands on either side of the intersection zone and is located at a distance from the intersection zone.

31. A detection device comprising a strapping device for binding an antenna which has a cross section having a perimeter being a regular polygon or a closed, convex, curved line, the detection device comprising a winch comprising a cable, the antenna being suspended from the cable and the strapping device being suspended from the winch, said strapping device comprising a strap comprising a clamping strip which forms a loop intended to surround the antenna, the clamping strip comprising a central part which defines a shape essentially following a shape of the perimeter of the cross section of the antenna and two strip strands comprising the respective ends of the clamping strip and having a shape which departs from the shape of the perimeter of the cross section of the antenna, the strap comprising at least one central shoe which is mounted on a first strip strand of the two strip strands in such a way as to be designed to be interposed between the antenna and the first strip strand.

* * * * *